United States Patent
Lee et al.

(10) Patent No.: US 8,388,719 B2
(45) Date of Patent: Mar. 5, 2013

(54) CERAMIC FILTER COMPRISING CLAY AND PROCESS FOR PREPARING THEREOF

(75) Inventors: Ju-Hyung Lee, Seoul (KR); Jong-Sik Choi, Daejeon (KR); Hoon Ahn, Daejeon (KR); Sun-Joo Kim, Daejeon (KR); Seong-Moon Jung, Daejeon (KR)

(73) Assignee: LG Chem, Ltd. (KR)

( * ) Notice: Subject to any disclaimer, the term of this patent is extended or adjusted under 35 U.S.C. 154(b) by 724 days.

(21) Appl. No.: 12/225,759

(22) PCT Filed: Apr. 2, 2007

(86) PCT No.: PCT/KR2007/001606
§ 371 (c)(1),
(2), (4) Date: Jan. 12, 2010

(87) PCT Pub. No.: WO2007/114626
PCT Pub. Date: Oct. 11, 2007

(65) Prior Publication Data
US 2010/0115899 A1    May 13, 2010

(30) Foreign Application Priority Data

Mar. 31, 2006 (KR) .................. 10-2006-0029764

(51) Int. Cl.
*B01D 24/00* (2006.01)
*B01D 39/14* (2006.01)
*B01D 39/06* (2006.01)
*B01D 50/00* (2006.01)
*F01N 3/00* (2006.01)

(52) U.S. Cl. ............... 55/523; 55/522; 55/524; 60/297; 422/169; 422/170; 422/171; 422/172; 422/177; 422/178; 422/179; 422/180; 422/181; 422/182

(58) Field of Classification Search ............ 55/522–524; 422/169–172, 177–182; 60/297
See application file for complete search history.

(56) References Cited

U.S. PATENT DOCUMENTS

| | | | | |
|---|---|---|---|---|
| 4,142,864 A | * | 3/1979 | Rosynsky et al. | 422/179 |
| 4,961,917 A | * | 10/1990 | Byrne | 423/239.2 |
| 5,145,825 A | * | 9/1992 | Deeba et al. | 502/242 |
| 5,721,037 A | * | 2/1998 | Kumazawa et al. | 428/116 |
| 6,077,483 A | * | 6/2000 | Locker et al. | 422/179 |
| 6,120,584 A | * | 9/2000 | Sakata et al. | 96/135 |

(Continued)

FOREIGN PATENT DOCUMENTS

| CN | 1553885 A | 12/2004 |
|---|---|---|
| KR | 10-0198016 B1 | 6/1999 |

(Continued)

OTHER PUBLICATIONS

European Search Report EP 07745769, dated Jun. 8, 2009.

*Primary Examiner* — Amber Orlando
(74) *Attorney, Agent, or Firm* — Lerner, David, Littenberg, Krumholz & Mentlik, LLP

(57) ABSTRACT

The present invention relates to a ceramic filter comprising clay and a process for preparing the same. More specifically, the present invention relates to the ceramic filter, including wave-shaped ceramic paper and plate-shaped paper, having improved efficiency and performance that may optimize the process of coating and calcining inorganic binder by forming an outer wall thereon, using clay, and thus increase insulation effect and mechanical strength represented by the clay layer, and the process for preparing thereof.

24 Claims, 2 Drawing Sheets

U.S. PATENT DOCUMENTS

| | | | |
|---|---|---|---|
| 6,352,578 B1 * | 3/2002 | Sakata et al. | 96/134 |
| 7,083,842 B2 * | 8/2006 | Masukawa et al. | 428/116 |
| 7,541,005 B2 * | 6/2009 | Kulkarni et al. | 422/177 |
| 7,560,154 B2 * | 7/2009 | Katoh | 428/116 |
| 2001/0036427 A1 * | 11/2001 | Yamada et al. | 422/179 |
| 2003/0165638 A1 | 9/2003 | Louks et al. | |
| 2003/0209488 A1 | 11/2003 | Nixdorf et al. | |
| 2004/0231307 A1 | 11/2004 | Wood et al. | |
| 2005/0025933 A1 * | 2/2005 | Masukawa et al. | 428/116 |
| 2006/0182669 A1 * | 8/2006 | Matumura et al. | 422/177 |
| 2006/0217256 A1 * | 9/2006 | Katoh | 501/1 |
| 2007/0017196 A1 * | 1/2007 | Choi et al. | 55/523 |
| 2007/0169453 A1 * | 7/2007 | Hayakawa | 55/523 |

FOREIGN PATENT DOCUMENTS

| | | |
|---|---|---|
| KR | 10-2004-0049279 A | 6/2004 |
| KR | 10-0469066 B1 | 1/2005 |

* cited by examiner

Fig. 2

Aluminum Silicate Coating

Process 1

Drying

Clay Painting

Process 2

Heat
Treatment

Aluminum Phosphate
Coating

Process 3

Calcining

Product

US 8,388,719 B2

CERAMIC FILTER COMPRISING CLAY AND PROCESS FOR PREPARING THEREOF

CROSS REFERENCE TO RELATED APPLICATIONS

The present application is a national phase entry under 35U.S.C. §371 of International Application No. PCT/KR2007/001606, filed Apr. 2, 2007, published in English, which claims priority from Korean Patent Application No. 10-2006-0029764, filed Mar. 31, 2006, all of which are incorporated herein by reference.

TECHNICAL FIELD

The present invention relates to a ceramic filter and a process for preparing the same. More specifically, the present invention relates to the ceramic filter having an improved efficiency and performance that may optimize the process of coating and calcining inorganic binders by forming an outer wall thereon, using clay, and thus increase the insulation effect and mechanical strength represented by the clay layer, and the process for preparing thereof.

BACKGROUND ART

Since the late 1970s, diesel particulate filters (DPF) have been studied as an apparatus for filtering particulates of exhaust gases in diesel engines. However, to develop engine designs and improve fuels could meet the environmental regulation standards by the 1980s, without equipping DPF. DPF has been actively studied after 1980 to meet stricter regulation standards. Said DPF should remove particulates included in exhaust gases by trapping them. Also, said DPF should have the performance that burns particulates before affecting engines by the resulting pressure drop and fully removes them, besides thermal resistance and durability. Such DPF may be classified into the following groups: honeycomb monolith filters, ceramic fiber filters, and metal filters. Among these, said honeycomb monolith filters have disadvantage of very little resistance to heat impact at high temperature and low durability, and said metal filters have disadvantage of low thermal resistance and low resistance to corrosion despite low cost and easiness for production. Therefore, study is recently carried out about fiber filters using ceramic fibers. Such ceramic fiber filters are prepared in the forms of foam, extrusion, and non-woven paper. Foam and extrusion forms have low resistance to heat impact and extruded honeycomb forms have disadvantage of low gas permeability due to low porosity rate, whereas non-woven paper forms are known to have high porosity rate and high removal efficiency of particulates.

Therefore, it needs to prepare novel ceramic filters having excellent gas permeability due to high porosity rate as well as strong resistance to heat impact in form of non-woven paper.

DISCLOSURE OF INVENTION

Technical Problem

To solve the above conventional problems, an object of the present invention is to provide a ceramic filter which can complement a phenomenon of changing the shape of filters, using the property of clay that hardens after drying and heat treatment and has excellent insulation effect and mechanical strength by clay.

Another object of the present invention is to provide a ceramic filter which minimizes cracks that may be caused on an outer wall during drying and calcining process by using the ceramic paper formed the coating layer of clay as an outer wall, and has a uniform thickness of the outer wall and thus does not need any polishing process.

The other object of the present invention is to provide a process for preparing said ceramic filter.

Technical Solution

To achieve the above objects, the present invention provides a ceramic filter comprising:

the first coating layer containing aluminum silicate on the outside of the ceramic filter body;

the second coating layer formed on the first coating layer and containing clay; and optionally, the third coating layer formed on the second coating layer and containing aluminum phosphate.

In addition, the present invention provides a process for preparing a ceramic filter comprising the steps of:

(a) forming the first coating layer on the outside of the ceramic filter body with a solution containing aluminum silicate;

(b) forming the second coating layer on the first coating layer with a solution containing clay; and (c) optionally, forming the third coating layer on the second coating layer with a solution containing aluminum phosphate.

BRIEF DESCRIPTION OF THE DRAWINGS

FIG. 2 is a brief diagram of process for preparing the ceramic filter according to the present invention.

BEST MODE FOR CARRYING OUT THE INVENTION

Figure 1:
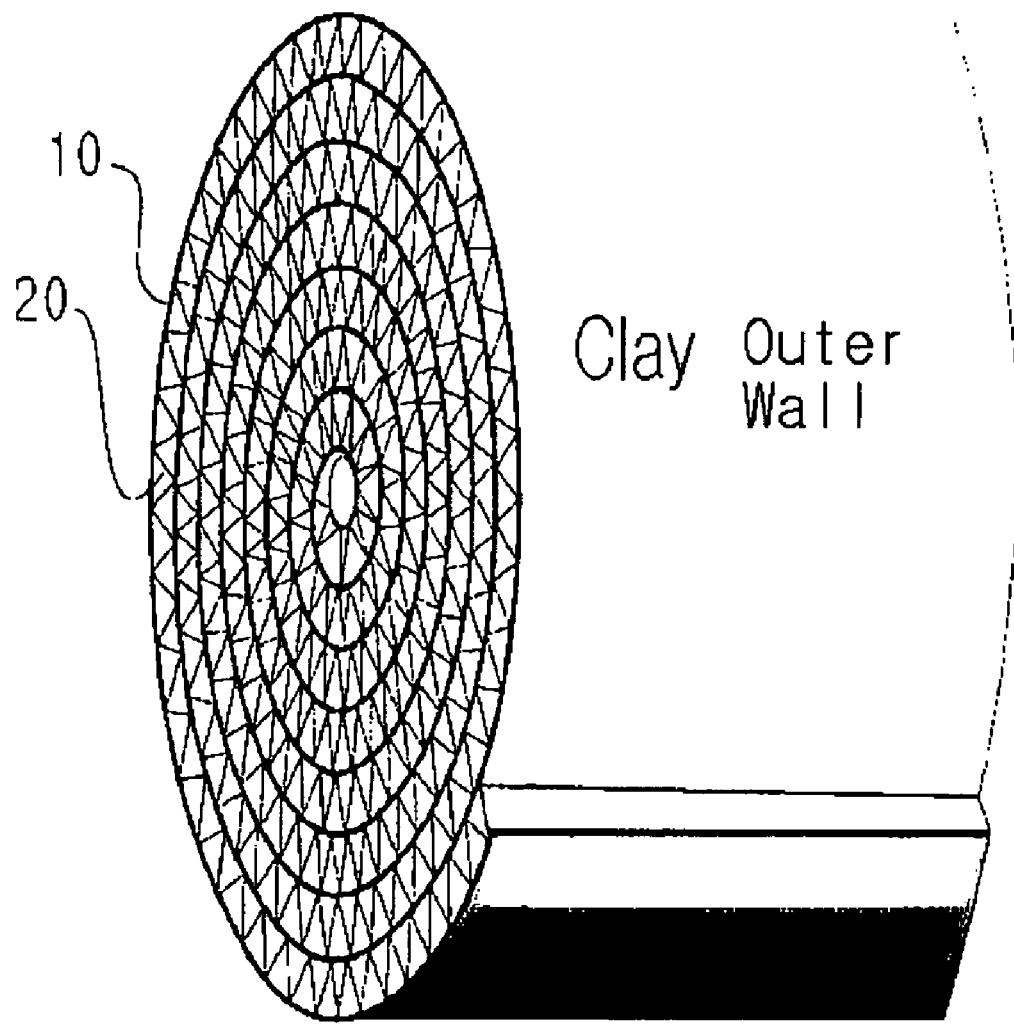
FIG. 1 is a schematic perspective view of the ceramic filter according to the present invention.

Hereinafter, the present invention will be described in more detail.

The present invention relates a ceramic filter comprising:

the first coating layer containing aluminum silicate on the outside of the ceramic filter body;

the second coating layer formed on the first coating layer and containing clay; and optionally, the third coating layer formed on the second coating layer and containing aluminum phosphate.

One embodiment of the ceramic filter according to the present invention is characterized in that it is capable of complementing a phenomenon of changing the filter shape, by adding to the outside of ceramic filter a coating layer containing clay that hardens after drying and heat treatment, and thus has excellent insulation effect and mechanical strength.

Another embodiment of the ceramic filter according to the present invention is characterized in that it minimizes cracks that may be caused on the outer wall during drying and calcining process by adding to the outside of the ceramic filter ceramic paper impregnated in the slurry containing clay, and has a uniform thickness of the outer wall and thus is not needed any polishing process.

The shape of ceramic filter according to the present invention includes preferably, but not limited to, the honeycomb structure including a wave-shaped ceramic paper and a plate-shaped ceramic paper. Said ceramic paper is not specifically limited as long as it is prepared by paper making methods commonly used in this field. However, considering the strength and porosity property after calcining, it includes one or more ceramic fibers selected from the group consisting of alumina, alumino silicate, alumino borosilicate and mullite.

In one embodiment of the present invention, the second coating layer of ceramic filter comprises one or more clays consisting of bentonite, kaolin, agalmatolite and talc, and ceramic fibers. The amount of clay to ceramic fibers is not limited, but preferably a ratio by weight of 6~60:1. If the ratio of clay is less than 6, the outer wall of clay may be separated from the filter. If the ratio is in excess of 60, cracks may be caused during drying process.

In another embodiment according to the present invention, the second coating layer of ceramic filter comprises ceramic papers, and the clay coating layer, formed on said ceramic paper, containing one or more clays selected from the group consisting of bentonite, kaolin, agalmatolite and talc; silica sol; and ceramic powders. Preferably, said ceramic paper uses the same materials as those of ceramic filter body. Specifically, it comprises one or more ceramic fibers selected from the group consisting of alumina, alumino silicate, alumino borosilicate and mullite. If such ceramic papers made by the same materials as those of the ceramic filter body are used as frames of the outer wall, cracks of the clay coating layer formed on said ceramic paper can be minimized during processes at high temperature, such as drying and calcining. In addition, said ceramic powder may provide additional functions, such as strength, heat transfer efficiency or insulation efficiency, using one or more selected from the group consisting of SiC, alumina, zirconia, and silica.

The present invention also relates to a process for preparing a ceramic filter comprising the steps of (a) forming the first coating layer on the outside of the ceramic filter body with a solution containing aluminum silicate;

(b) forming the second coating layer on the first coating layer with a solution containing clay; and (c) optionally, forming the third coating layer on the second coating layer with a solution containing aluminum phosphate.

The process for preparing ceramic filter according to the present invention is described in detail below.

The step (a) above is a process in which a porous ceramic filter obtained by bonding a wave-shaped ceramic paper and a plate-shaped ceramic paper is firstly coated with an aluminum silicate solution having good adhesion and affinity to said ceramic paper to form a primer layer.

The porous ceramic paper used in the step (a) above may be prepared by common paper-making methods used in this field. Preferably, the slurry solution used in said paper-making methods contains 5 to 30 parts by weight of an organic fiber and 0.1 to 20 parts by weight of an organic binder relative to 100 parts by weight of the ceramic fiber.

Said ceramic fiber is obtained by materials which can stand at a temperature of 1200° C. or more, and use those that at least one of alumina or silica is contained, such as alumina, alumino silicate, and the like. For example, the ceramic fiber selected from the group consisting of alumina, alumino silicate, alumino borosilicate, and mullite may be used. Preferably, the ceramic fiber has a diameter of 1-20 microns, and more preferably 2-7 microns, and a length of 0.1-10 mm. The amount of ceramic fiber is 50-80 parts by weight, and preferably 70-80 parts by weight, based on total solid contents in the slurry. If the amount of ceramic fiber is less than 50 parts by weight, it may have adverse effect on strength and porosity property after calcining. If the amount is in excess of 80 parts by weight, the amounts of organic fiber and organic binder are so low that tensile strength may be lowered in the wave-shaping step.

Said organic fiber may be selected from the group consisting of natural fiber such as cellulose fiber, and hemp; synthetic fiber such as nylon, rayon, polyester, polypropylene, polyethylene, aramid, and acryl fiber; and mixtures thereof, wherein a specific example of aramid fiber includes Kevlar fiber which is commercially available from DuPont. The amount of organic fiber is preferably 5-30 parts by weight relative to 100 parts by weight of the ceramic fiber in the slurry. If the amount is less than 5 parts by weight, tensile strength may be lowered. If the amount is in excess of 30 parts by weight, strength may be lowered since an excess of alumina phosphate hollow fiber is present after heat treatment.

Organic binders include acryl based binders, polyvinyl alcohol, cationic starches, epoxy based binders, and the like. They may be used alone or in admixture of each other, and improve bonding strength between fibers in the paper-making process. The amount of organic binder is 0.1 to 20 parts by weight relative to 100 parts by weight of the ceramic fiber. When the amount is less than 0.1 parts by weight, fibers are not bonded to each other. When the amount is in excess of 20 parts by weight, the ceramic paper has high fluidity and shows adhesiveness. Therefore, it is not easy to handle it. Organic binders should have flexibility for higher glass transition temperature than room temperature and the three dimensional structure.

In addition, water may be included in said slurry solution. The amount of water used in the slurry solution is not critical, but is as much as all steps are smoothly maintained. For removing smoothly water in the process, the present invention may remove an excess amount of water through a vacuum pump connected to a paper-making machine, and the remaining excess amount of water through a press machine.

Also, the slurry solution of the present invention may further comprise a common pH controlling agent for improving bonding strength of the organic binder to the ceramic fiber or the organic fiber. Such pH controlling agents are not specifically limited as long as they are conventionally used in this field. For example, pH of the slurry solution may be maintained between 5.5 and 6.5 by using alum (aluminum sulfate).

The ceramic filter according to the present invention is prepared in the honeycomb forms by wave-shaping the ceramic green paper prepared as above and then bonding the wave-shaped ceramic paper and the plate-shaped ceramic paper together. The third step to provide an outer wall of ceramic filter according to the present invention is preferably carried out after preparing the ceramic filter with honeycomb forms. The wave-shaping process may be conducted by using a wave-shaping machine conventionally used in this field.

Furthermore, the aluminum silicate solution in the step (a) above comprises a mixture of alcohol, aluminum nitrate, tetra-alkyl orthosilicate and hydrochloric acid. Boric acid may be further added thereto. The amount of each component in the aluminum silicate solution is preferably 0.2-0.5 moles of alcohol, 0.01-0.02 moles of aluminum nitrate, and $0.1 \times 10^{-3}$~$0.2 \times 10^{-3}$ moles of hydrochloric acid, based on 1 mole of tetra-alkyl orthosilicate.

An example of said tetra-alkyl orthosilicate is not specifically limited, and preferably includes tetra-methyl orthosilicate or terta-ethyl orthosilicate (TEOS, below).

Also, an example of said alcohol is not specifically limited, and selected from the group consisting of lower alcohol with 1 to 6 of carbon atoms, such as ethanol, methanol, isopropyl alcohol and propanol. If the amount of said alcohol is increased, concentration of total aluminum silicate solution is lowered and thus, the coating layer with an appropriate thickness is not easy formed. If the amount of said alcohol is less than 0.2 moles, there is a problem that viscosity of the coating solution is too high upon forming gel. Also, if the amount of aluminum nitrate is less than 0.01 moles, it is difficult to form aluminum silicate. If the amount of aluminum nitrate is in excess of 0.02 moles, it is not dissolved well in alcohol. If the amount of hydrochloric acid is less than $0.1 \times 10^{-3}$ mole, the hydrolysis reaction is not occurred. If the amount of hydrochloric acid is in excess of $0.2 \times 10^{-3}$ moles, the rate of hydrolysis is promoted to rapidly form gel in particulate, whereby the degree of dispersion may be lowered and closure of pores may be occurred. In addition, boric acid is added in a minimal amount and has actions that it increases bonding strength of the inorganic binder by replacing partially with aluminum ions and contributes to thermal stability at high temperature. Preferably, it is added in the minimal amount of 0.01 to 0.02 moles relative to 1 mole of tetra-alkyl orthosilicate.

When the ceramic filter coated with said aluminum silicate solution is subjected to a drying step, it is carried out at room temperature to 200° C. regardless of time. It is sufficient to dry for 1 hr at 150° C., considering normal schedule in the process.

In preparing the process for preparing a ceramic filter according to the present invention, the step (b) comprises forming the second coating layer on the first coating layer with a composition containing clay. In an exemplified aspect of the present invention, the step (b) may use a method of direct forming the second coating layer containing clay on the first coating layer and a method of providing a ceramic paper having the same material as the ceramic filter with the coating layer containing clay thereon followed by attaching it to the first coating layer.

The method of direct forming said second coating layer on the first coating layer refers to a process that the clay composition is applied to the outer wall of ceramic filter on which the first coating layer is formed, dried and then, heat treated to increase strength of the filter and give insulation effect to the filter.

It is important that the clay applied in the above process should not be caused to crack during drying and heat treatment. Preferably, when the outer wall is prepared by using the clay composition comprising water in which bentonite and ceramic fibers are dispersed, the viscosity that clay does not cause to crack during the above process may be obtained. Preferably, as components of clay, 12 to 25 parts by weight of clay selected from the group consisting of bentonite, kaolin, agalmatolite and talc and 0.2 to 2 parts by weight, more preferably 0.5 to 1.5 parts by weight, of ceramic fibers are added, based on 100 parts by weight of water. The viscosity of the clay composition may depend on a kind of bentonite. Most preferably, clay is bentonite. Bentonite is a mineral including montmorilloinite as a main component. Swellability and gel-forming ability of bentonite upon absorbing water vary with a kind of cationic ions present between layers of bentonite. Bentonite includes roughly Ca-bentonite and Na-bentonite. Na-bentonite has fine particles, high swellability, and high gel-forming ability upon absorbing water as well. Therefore, as the bentonite used in the present process, Na-bentonite having high content of montmorillonite is more preferably used. Specifically, it is advantageous to use bentonite having less than 1% of Ca and 1% or more of Na for preparing the clay composition with a viscosity appropriate to painting.

In addition, ceramic fibers used in said clay composition are not limited, and may use those used in preparing the ceramic filter. That is, the ceramic fiber comprises preferably a material which can stand at high temperature of 1200° C. or more, considering that it is used as the filter at high temperature. Advantageously, the length of ceramic fiber is 0.1-0.5 mm. If the amount of ceramic fiber is less than 0.2 parts by weight, cracks may be caused during drying process. If the amount of ceramic fiber is more than 2.0 parts by weight, the outer wall of clay may be separated from the filter after the final heat treatment in the third step. Also, water is not limited, but preferably the distilled water is used in that it does not change physical properties of bentonite.

When the ceramic filter coated with said aluminum silicate solution is subjected to a drying step, it is carried out at room temperature to 200° C. regardless of time. It is sufficient to dry at 150° C. for 1 hr, considering normal schedule in the process. The heat treatment is preferably carried out at a temperature of 400 to 1100° C. in air for burning organics. Since it is sufficient to solidify the outer wall material of clay in the second step, the heat treatment at least 400° C. is effective.

In the process for preparing a ceramic filter according to the present invention, the method of providing a ceramic paper having the same material as the ceramic filter with the coating layer containing clay thereon followed by attaching it on the first coating layer comprises the following steps:

preparing a ceramic paper from the slurry solution containing ceramic fibers (step 1);

impregnating the ceramic paper into the slurry containing clay (step 2); and attaching the ceramic paper impregnated in the slurry to the first coating layer (step 3).

In said step 1), the outer wall ceramic paper attached to the ceramic filter body is characterized in that it comprises the same materials as those of the filter body. Therefore, as described previously about the filter body, the outer wall of filter as ceramic paper may be prepared from the slurry for preparing the ceramic paper including 5 to 30 parts by weight of an organic fiber and 0.1 to 20 parts by weight of an organic binder, relative to 100 parts by weight of ceramic fibers.

For example, the ceramic paper of the filter outer wall used in the present invention may be prepared by a conventional ceramic green paper-making method used in this field. At that time, the slurry solution may comprise, in addition to the ceramic fibers, an organic fiber, preferably one or more organic fibers selected from the group consisting of natural fiber such as needle-leaf tree pulp, wood fiber, and hemp; synthetic fiber such as nylon, rayon, polyester, polypropylene, polyethylene, aramid, and acryl; and mixtures thereof. The slurry solution may further comprise a small amount of the organic binder. Components contained in the slurry solution for preparing the ceramic green paper are described in the filter body above.

In said step 2), the slurry containing clay includes preferably 1 to 5 parts by weight of clay selected from the group consisting of bentonite, kaolin, agalmatolite and talc; 1 to 5 parts by weight of silica sol; and 10 to 15 parts by weight of one or more ceramic powders selected from the group consisting of SiC, alumina, zirconia, and silica relative to 100 parts by weight of water. Also, said solid content contained in the slurry is preferably ceramic powders such as SiC, alumina, zirconia, silica and the like. The viscosity of said slurry is not specifically limited as long as impregnation may be smoothly carried out.

In said step 3), the outer wall impregnated in the slurry obtained in the step 2) is attached to the outside of ceramic filter body. The slurry containing clay present on ceramic paper for the outer wall can be attached to the body by itself, but if desired, an additional adhesive may be used. Preferably, the adhesive includes starch powders. More preferably, it uses together with silica powder for enhancing bonding strength after heat treatment at high temperature.

The method of providing ceramic paper having the same material as the ceramic filter with the coating layer containing clay thereon followed by attaching it to the first coating layer may comprises further a step in which the ceramic filter formed in the step 3) is dried at room temperature to 200° C., and is subjected to heat treatment at a temperature of 400 to 1100° C. Said heat treatment is preferably carried out in vacuum, inert gas or air. If said heat treatment temperature is lower than 400° C., organic components are not removed fully. If it is in excess of 1100° C., the strength of ceramic filter may be lowered.

As described above, the present invention prevents from causing cracks by impregnating filter outer wall having the same material as the ceramic filter body into the slurry, bonding it to the ceramic filter body, and being subject to heat treatment to incorporate both without difference of the coefficient of thermal expansion.

In the process for preparing the ceramic filter according to the present invention, the step (c) is a process obtaining the final ceramic filter with excellent mechanical strength and porosity by secondary coating it with the aluminum phosphate solution having excellent bonding strength to the layer comprising said aluminum silicate and low viscosity, to form a precursor of the inorganic binder, and being subjected to heat treatment at high temperature.

Said step (c) comprises secondary coating the ceramic filter obtained through steps (a) and (b) with aluminum phosphate and finally calcining it. The aluminum phosphate solution used in the present invention contains aluminum nitrate and phosphoric acid, and preferably has a P/Al atomic ratio of 3-50. If the atomic ratio is less than 3, solubility of alumina is very low, and aluminum phosphate cannot be smoothly formed. If the atomic ratio is in excess of 50, then the concentration of alumina is low due to the excess amount of phosphoric acid to deteriorate the performance, and the surface of fiber is damaged to lower the strength. The weight of aluminum phosphate in the aluminum phosphate solution is preferably 1-80 parts by weight, based on the solid contents. If the weight of said aluminum phosphate is less than 1 part by weight, the coating should be repeated several times to coat a required amount. If the weight is in excess of 80 parts by weight, the closure of pores may be caused due to the excessive amount of aluminum phosphate remaining in the pores.

The step of calcining the final ceramic filter in the third step is preferably calcined in vacuum, inert gas or air at a temperature of 800 to 1100° C. If said calcining temperature is lower than 800° C., organic components are not removed fully. If it is in excess of 1100° C., said aluminum phosphate may be modified to lower the strength.

In the steps (a) and (c) above, the method of coating coiled ceramic papers with a solution of aluminum silicate and aluminum phosphate is not specifically limited, but may be carried out, for example, by impregnating or spraying.

In addition, said steps (a) to (c) in the present invention can be carried out only one time, but aluminum phosphate coating and calcining processes of the step (c) may be additionally carried out for improving the strength.

The present invention is described in more detail in the following examples, which are not limited.

Example 1

(1) Preparation of Wave-Shaped Ceramic Paper 3 g of alumina-silica fiber having an average length of 300□ was added to 2000 ml of water, and the mixture was dispersed with vigorously stirring. Then, pulp of needle-leaf tree as an organic fiber was introduced into the resulting dispersion in the amount of 25% by weight relative to the ceramic fiber, and an acryl binder was added thereto in the amount of 10% by weight relative to the ceramic fiber for flexibility of ceramic papers, and 1 ml of 1% aqueous solution of ammonium aluminum sulfate with pH 3 was added thereto to adjust the pH of the total slurry solution to about 5.5. Then, the slurry solution was mildly continued to stirring to evenly mix solid contents therein, followed by preparing a ceramic green paper with 9.5 cm of diameter and 800□ of thickness using a paper-making machine. Then, the ceramic green paper prepared above was dried in air at room temperature for 30 minutes, and then further dried in a vacuum oven at 100° C. to remove the remaining water.

Then, the ceramic green paper was wave-shaped using drum whose lengths of valley and pitch are manufactured by 3 mm, and wave-shaping machine whose surface temperature and feeding rate are adjusted, to prepare the ceramic wave-shaped paper.

(2) Preparation of Plate-Shaped Ceramic Paper

The plate-shaped ceramic paper was prepared by the same method as example 1-(1), except for not wave-shaping.

(3) Preparation of Coiled Ceramic Filter

The plate-shaped ceramic paper was placed on the underlying part of the wave-shaped ceramic paper prepared above, and applied an adhesive to both contacting surfaces to bond them. At that time, starch powder was used as the adhesive, and silica powders were added thereto for enhancing the bonding strength after heat treatment at high temperature. In such state that upper lying part and underlying part were bonded, the bonded paper was coiled to the shape of cochlea, and heated at 100° C. to dryness to prepare the coiled ceramic filter.

Example 2

Process for Measuring Physical Property of Clay

The degree of forming cracks according to contents of water and ceramic fiber was identified using three types of bentonite (Volclay-NF-BC, Cosmetic bentonite, Laundry bentonite) contents of Ca and Na as indicated in Table 1 below. Specific compositions thereof were as follows:

TABLE 1

| Supplier | | Ca, Na, K Contents |
|---|---|---|
| VolClay Kor. | C-bentonite | 1.2%, 1.4%, 140 ppm |
| | L-bentonite | 1.0%, 0.1%, 580 ppm |
| | V-bentonite | 0.64%, 1.3%, 710 ppm |

Swellability of each bentonite was slightly different from each other and thus the viscosity appropriate for painting was selected by slightly varying the amount of water. As a ceramic fiber, 0.1 to 0.5 mm of mullite fiber was used, and each amount was changed to 0, 0.25 parts by weight, 0.5 parts by weight, 1 part by weight, 2 parts by weight, 4 parts by weight, based on 100 parts by weight of water. The ceramic filter painted by clay was dried at 150° C.

As a result, laundry bentonite containing many organics, in the end, showed the most severe cracks. Cosmetic bentonite and volclay-NF-BC showed no crack and stripping phenomenon of outer wall, in case of 0.5 parts by weight to 1.5 parts by weight of ceramic fiber. However, cosmetic bentonite was too high swellability to regulate the viscosity, whereas the strength after drying was lower than that of volclay-NF-BC. When 0.5 parts by weight of ceramic fiber and 12 to 25 parts by weight of volclay-NF-BC were added in 100 parts by weight, the clay showed the viscosity useful in painting. That is, when 12 parts by weight of volclay-NF-BC was added, it showed to be slightly thin, whereas when 25 parts by weight of volclay-NF-BC was added, it showed a paste form. When 18 g of volclay-NF-BC was added, the optimal viscosity useful in painting was obtained.

Comparative Example 1

The clay composition was prepared by the same method as Example 2 to measure the physical property, except that the amount of volclay-NF-BC was less than 12 g. As a result, cracks were not caused during drying, but the clay showed a phenomenon that it was stripped from the filter after final calcining.

Comparative Example 2

The clay composition was prepared by the same method as Example 2 to measure the physical property, except that the amount of volclay-NF-BC was in excess of 25 g. As a result, the viscosity was so high that it was disadvantageous in painting, and cracks were caused during drying and heat treatment procedures.

Example 3

(1) Process 1: Process of Coating the Filter with Aluminum Silicate Solution (Primary Coating Solution)

The coiled ceramic paper filter prepared in Example 1 above was dipped in aluminum silicate solution for 30 seconds, removed and dried at 150° C.

The aluminum silicate solution above was prepared by dissolving 40 g of aluminum nitrate and 0.4 g of boric acid in 100 ml of ethanol, adding 16 ml of 0.1M hydrochloric acid to the mixture with stirring, and adding 100 ml of TEOS thereto.

(2) Process 2: Process of Coating the Filter with Clay

In painting the ceramic filter prepared in Process 1 above, the clay prepared in Example 2 by adding 0.5 parts by weight of the ceramic fiber and 18 parts by weight of volclay-NF-BC to 100 parts by weight was used. The ceramic filter was prepared through heat treatment at 400° C. Upon painting, the outer wall thickness of clay is not important. However, the thicker its thickness is, the heavier its weight is, whereas the thinner its thickness is, the lower its strength is. Therefore, the appropriate thickness is preferably 2 mm.

(3) Process 3: Step of Coating the Filter with Aluminum Phosphate Solution (Secondary Coating Solution)

After Process 2 completing the heat treatment at 400° C., the coiled ceramic filter was impregnated in the aluminum phosphate solution for 30 seconds. The aluminum phosphate solution with a P/Al atomic ratio of 7.5 was prepared by dissolving 75 g of aluminum nitrate and 5 g of boric acid in 100 ml of distilled water and adding 100 ml of 85% phosphate solution thereto. The particular drying procedure is not required for the ceramic filter impregnated in the aluminum phosphate solution. However, if the ceramic filter covered with much solution is finally calcined, the solution is boiled to show a phenomenon that the ceramic filter has a rough surface. Therefore, the ceramic filter was subjected to heat treatment by calcining it at 1000° C. in air to prepare the coiled ceramic filter.

Example 4

The ceramic filter was prepared by the same method as Example 2 above, except that in Process 1 of Example 3, the amounts of aluminum nitrate and boric acid in the primary coating solution were fixed and the amounts of TEOS and hydrochloric acid were reduced. That is, the primary coating solution prepared by dissolving 40 g of aluminum nitrate and 0.4 g of boric acid in 100 ml of ethanol, adding 1 ml of 0.1 M hydrochloric acid thereto with stirring, and adding 50 ml of TEOS thereto, was used.

Example 5

The ceramic filter was prepared by the same method as Example 2 above, except that in Process 3 of Example 3, the amount of phosphoric acid in the aluminum phosphate solution was fixed, the amount of distilled water was increased and the amount of aluminum nitrate was reduced. That is, the secondary coating solution with a P/Al atomic ratio of 15 was prepared by dissolving 37.5 g of aluminum nitrate and 3 g of boric acid in 200 ml of distilled water, adding 100 ml of 85% phosphoric acid solution thereto. The ceramic filter completing Process 2 was dipped in the secondary coating solution for 30 seconds, removed, and calcined at 1,000° C. to prepare the coiled ceramic filter.

Comparative Example 3

The same method as Example 3 above was carried out except that the clay coating of Process 2 in Example 3 was not practiced.

Comparative Example 4

When the ceramic filter of Example 1 was prepared, 30 g of volclay-NF-BC was used. Using such obtained filter, Processes 1 and 3 of Example 3 were carried out to prepare the ceramic filter.

Example 6

(1) Preparation of Ceramic Paper for Outer Wall of Filter 2.1 g of alumina-silica fiber having an average length of 300□ was added to 2000 ml of water, 0.09 g of Kevlar organic fiber was added thereto and the fiber was dispersed with vigorously stirring. Then, pulp of needle-leaf tree as organic fiber was introduced into the resulting dispersion in the amount of 26.4% by weight relative to the ceramic fiber, and an organic binder was added thereto in each amount of 0.3% by weight, 0.1% by weight, 0.1% by weight and 0.1% by weight relative to the ceramic fiber for flexibility of the ceramic paper. Then, the slurry solution was mildly continued to stirring to evenly mix solid contents therein, followed by preparing a ceramic green paper with 400□ of thickness using a paper-making machine. Then, the ceramic green paper prepared above was dried at room temperature, and then the remaining water was dried by drum dryer to use the outer wall of filter.

(2) Preparation of Honeycomb Type Ceramic Filter Body (2)-1. Preparation of Plate Type Ceramic Paper The ceramic green paper prepared in Preparation of outer wall of filter above was wave-shaped in a feeding rate of 2-10 m/minute at the surface temperature of 150° C., using a wave-shaping machine (Model: KIER, manufacturer: Wha-Sung Instrument, lengths of valley and pitch: 2 mm and 3 mm, respectively).

(2)-2. Preparation of Plate Type Ceramic Paper

The ceramic green paper prepared in Preparation of outer wall of filter above was used as plate type ceramic paper.

(2)-3. Preparation of Honeycomb Type Ceramic Filter Body

The plate-shaped ceramic paper prepared by the method above was placed on the underlying part of the wave-shaped ceramic paper prepared above, and applied an adhesive to both contacting surfaces to bond them. At that time, starch powders were used as the adhesive, and silica powder was added thereto for enhancing the bonding strength after heat treatment at high temperature. In such state that upper lying part and underlying part were bonded, the bonded paper was coiled to the shape of cochlea, and heated at 100° C. to dryness to prepare the honeycomb type ceramic filter.

Then, the first coating solution was prepared by dissolving 5 g of aluminum nitrate and 0.5 g of boric acid in 10 ml of alcohol, adding 1.6 ml of 0.1M hydrochloric acid thereto with stirring, and adding 10 ml of TEOS thereto. The honeycomb type ceramic filter prepared above was dipped in the first coating solution for 5 seconds, removed and dried at 120° C.

(3) Preparation of Outer Wall Integrated Ceramic Filter

The outer wall of filter prepared in the step (1) above was dipped in the slurry for outer wall, which was prepared by ball milling the aqueous slurry for outer wall containing 3 parts by weight of bentonite clay, 3 parts by weight of silica sol and 15 parts by weight of solid contents (SiC powder) and water as a medium of slurry for 3 hours. After the end of dipping, the resulting outer wall was adhered to the outside of ceramic filter body prepared in the step (2) above, dried overnight at room temperature to prepare the ceramic filter that the outer wall was bonded to be integrated.

Then, the secondary coating solution with a P/Al atomic ratio of 7.5 was prepared by dissolving 7.5 g of aluminum nitrate and 0.5 g of boric acid in 10 ml of distilled water and adding 10 ml of 85% phosphoric acid solution thereto. Said ceramic filter that the outer wall was bonded to be integrated was dipped in the secondary coating solution for 5 seconds, removed, dried at 120° C., and calcined at 800° C. in air to prepare the honeycomb type ceramic filter.

Experimental Example 1

Strength of the ceramic filters of Examples 3-5 and Comparative Examples 3-4 was measured as follows:

Specimens, as assumed the outer wall, were prepared in the size of 4×4 cm. Load strength of the outer wall specimen was measured using Universal Testing Machine (UTM) and the results were indicated below.

TABLE 2

| | Load Strength (gf) | Thickness of specimen (mm) |
|---|---|---|
| Comparative Examples (conventional outer wall) | 321 | 0.52 |
| Examples (clay outer wall) | 760 | 1.21 |

As a result, the strength of filters that the clay outer walls of Examples 3-5 were added was increased three or more times compared to that of Comparative Examples 3-4. Also, the thicker the clay was, the higher the strength increased. This fact is allowed to maintain much safer strength on canning by overcoming the brittleness of filter. In addition, the triple outer wall structure of filter-clay-alumina phosphate is considered to develop sufficiently the known insulation effect of clay.

Experimental Example 2

On investigating the appearance of the outer wall integrated ceramic filter prepared in Example 6 above, cracks were not caused on the outside at all, and flat crush strength was increased three or more times than that of Comparative Example 3.

INDUSTRIAL APPLICABILITY

As described above, the outer wall of ceramic filter according to the present invention is prepared using clay. Therefore, conventional heat treatment processes may be largely reduced by optimizing coating with inorganic binder and calcining processes, and thus the cost may be reduced. In addition, the ceramic filter has high operating efficiency of filter due to insulation effect of the outer wall of clay as well as increase of strength.

Those skilled in the art will appreciate that the concepts and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A ceramic filter comprising:
    a first coating layer containing aluminum silicate on the outside of a ceramic filter body;
    a second coating layer formed on the first coating layer and containing clay; and
    a third coating layer formed on the second coating layer and containing aluminum phosphate.

2. The ceramic filter according to claim 1, wherein said ceramic filter body has a honeycomb structure comprising a wave-shaped ceramic paper and a plate-shaped ceramic paper.

3. The ceramic filter according to claim 2, wherein said ceramic paper comprises one or more ceramic fibers selected from the group consisting of alumina, alumino silicate, alumino borosilicate and mullite.

4. The ceramic filter according to claim 1, wherein the second coating layer of ceramic filter comprises one or more clays consisting of bentonite, kaolin, agalmatolite and talc, and ceramic fibers.

5. The ceramic filter according to claim 1, wherein the second coating layer of ceramic filter comprises ceramic paper, and clay coating layer, formed on said ceramic paper, containing one or more clays selected from the group consisting of bentonite, kaolin, agalmatolite and talc; silica sol; and ceramic powders.

6. The ceramic filter according to claim 5, wherein said ceramic paper comprises one or more ceramic fibers selected from the group consisting of alumina, alumino silicate, alumino borosilicate and mullite.

7. The ceramic filter according to claim 5, wherein said ceramic powder is one or more selected from the group consisting of SiC, alumina, zirconia, and silica.

8. The ceramic filter according to claim 4 or 5, wherein said bentonite is Na-bentonite having 1% or more of Na.

9. A process for preparing a ceramic filter comprising the steps of:
(a) forming a first coating layer on the outside of a ceramic filter body with a solution containing aluminum silicate;
(b) forming a second coating layer on the first coating layer with a solution containing clay; and
(c) forming a third coating layer on the second coating layer with a solution containing aluminum phosphate.

10. The process for preparing a ceramic filter according to claim 9, wherein said ceramic filter body in the step (a) comprises ceramic paper prepared from a slurry solution containing 5 to 30 parts by weight of an organic fiber and 0.1 to 20 parts by weight of an organic binder relative to 100 parts by weight of ceramic fiber.

11. The process for preparing a ceramic filter according to claim 10, wherein said ceramic paper comprises one or more ceramic fibers selected from the group consisting of alumina, alumino silicate, alumino borosilicate and mullite.

12. The process for preparing a ceramic filter according to claim 9, wherein the aluminum silicate solution in the step (a) comprises tetra-alkyl orthosilicate, alcohol, aluminum nitrate and hydrochloric acid.

13. The process for preparing a ceramic filter according to claim 12, wherein the aluminum silicate solution further comprises boric acid.

14. The process for preparing a ceramic filter according to claim 9, wherein the step of forming said second coating layer comprises applying the clay composition to the outer wall of ceramic filter on which the first coating layer is formed.

15. The process for preparing a ceramic filter according to claim 14, wherein the clay composition comprises 12 to 25 parts by weight of clay selected from the group consisting of bentonite, kaolin, agalmatolite and talc and 0.2 to 2 parts by weight of the ceramic fiber, based on 100 parts by weight of water.

16. The process for preparing a ceramic filter according to claim 14, wherein the ceramic filter applied by the clay composition is dried at room temperature to 200° C., and is subjected to heat treatment at a temperature of 400 to 1100° C.

17. The process for preparing a ceramic filter according to claim 9, wherein the step (b) forming the second coating layer comprises the following steps:
preparing ceramic paper from a slurry solution containing ceramic fiber;
impregnating the ceramic paper in the solution containing clay; and
attaching the ceramic paper impregnated in the solution containing clay on the first coating layer.

18. The process for preparing a ceramic filter according to claim 17, wherein the slurry solution containing the ceramic fiber comprises 5 to 30 parts by weight of an organic fiber and 0.1 to 20 parts by weight of an organic binder, relative to 100 parts by weight of the ceramic fiber.

19. The process for preparing a ceramic filter according to claim 17, wherein the solution containing clay comprises 1 to 5 parts by weight of clay selected from the group consisting of bentonite, kaolin, agalmatolite and talc; 1 to 5 parts by weight of silica sol; and 10 to 15 parts by weight of one or more ceramic powders selected from the group consisting of SiC, alumina, zirconia, and silica.

20. The process for preparing a ceramic filter according to claim 17, wherein the ceramic filter attaching the ceramic paper impregnated in the solution containing clay on the first coating layer is dried at room temperature to 200° C., and is subjected to heat treatment at a temperature of 400 to 1100° C.

21. The process for preparing a ceramic filter according to claim 9, wherein the aluminum phosphate solution comprises aluminum nitrate and phosphoric acid.

22. The process for preparing a ceramic filter according to claim 21, wherein the aluminum phosphate solution has a P/Al atomic ratio of 3-50.

23. The process for preparing a ceramic filter according to claim 21, wherein the amount of solid contents of aluminum phosphate in the aluminum phosphate solution is 1-80 parts by weight.

24. The process for preparing a ceramic filter according to claim 9, further comprising a step of calcining the ceramic filter that the third coating layer is formed at a temperature of 800 to 1100° C.

* * * * *

UNITED STATES PATENT AND TRADEMARK OFFICE
CERTIFICATE OF CORRECTION

PATENT NO. : 8,388,719 B2  
APPLICATION NO. : 12/225759  
DATED : March 5, 2013  
INVENTOR(S) : Ju-Hyung Lee et al.

Page 1 of 1

It is certified that error appears in the above-identified patent and that said Letters Patent is hereby corrected as shown below:

On the Title Page, Item (57), Abstract, line 6 "calcining inorganic" should read -- calcining an inorganic --.

In The Specification

Column 2, line 4 "formed the coating layer" should read -- formed of the coating layer --.
Column 6, line 19 "treatment at least" should read -- treatment of at least --.
Column 8, line 5 "300□" should read -- 300 μm --.
Column 8, line 16 "800□" should read -- 800 μm --.
Column 9, line 11 "was added" should read -- were added --.
Column 10, line 49 "300□" should read -- 300 μm --.
Column 10, line 59 "400□" should read -- 400 μm --.

Signed and Sealed this  
Twentieth Day of January, 2015

Michelle K. Lee  
*Deputy Director of the United States Patent and Trademark Office*